United States Patent [19]

Lewin

[11] Patent Number: 4,886,536

[45] Date of Patent: Dec. 12, 1989

[54] METHOD OF USING EVENLY DISTRIBUTED AIR FLOW TO CONDITION GLASS FILAMENTS PRIOR TO APPLICATION OF SIZING

[75] Inventor: David F. Lewin, Amarillo, Tex.

[73] Assignee: Owens-Corning Fiberglas Corporation, Toledo, Ohio

[21] Appl. No.: 257,378

[22] Filed: Oct. 13, 1988

Related U.S. Application Data

[63] Continuation of Ser. No. 85,120, Aug. 14, 1987, abandoned.

[51] Int. Cl.⁴ .................. C03B 37/02; C03B 25/02
[52] U.S. Cl. ............................... 65/3.1; 65/2; 65/12
[58] Field of Search .............. 65/2, 3.1, 12, 5, 3.4, 65/3.41

[56] References Cited

U.S. PATENT DOCUMENTS

| | | | |
|---|---|---|---|
| 3,304,163 | 2/1967 | Holschlag | 65/12 X |
| 3,625,025 | 12/1971 | Jensen | 65/2 |
| 3,969,099 | 7/1976 | Reese | 65/2 |
| 4,033,742 | 7/1977 | Nichols et al. | 65/2 |
| 4,049,411 | 9/1977 | Long et al. | 65/2 |
| 4,088,468 | 5/1978 | Roberson | 65/3.1 |
| 4,088,469 | 5/1978 | Schafer | 65/12 X |
| 4,130,406 | 12/1978 | Wakasa et al. | 65/2 |
| 4,197,103 | 4/1980 | Ishikawa et al. | 65/2 |
| 4,300,929 | 11/1981 | Carruth et al. | 65/2 |
| 4,681,805 | 7/1987 | Puckett | 65/3.41 X |

*Primary Examiner*—Robert L. Lindsay
*Attorney, Agent, or Firm*—P. P. Pacella; Catherine B. Martineau

[57] ABSTRACT

A method for forming continuous glass fibers is provided comprising the steps of supplying a plurality of streams of molten glass from a bushing, drawing the streams into continuous filaments, passing a stream of air across the continuous filaments in a direction of between approximately 20°–30° below horizontal to cool the continuous filaments, thereafter, applying a sizing material to the cooled continuous filaments and collecting the continuous filaments on a spindle or collet.

4 Claims, 1 Drawing Sheet

METHOD OF USING EVENLY DISTRIBUTED AIR FLOW TO CONDITION GLASS FILAMENTS PRIOR TO APPLICATION OF SIZING

This is a continuation of application Ser. No. 085,120, filed 8/14/87, now abandoned.

BACKGROUND OF THE INVENTION

This invention relates generally to a method of using evenly distributed air flow to condition glass filaments prior to the application of a sizing material on the glass filaments.

The use of a flow of air across glass filaments has been used to improve the environment of the fiber forming process. In particular, U.S. Pat. No. 4,088,469 discloses a fiber forming system employing horizontally directed air in combination with a horizontally oriented air jet to entrain additional air to control the environment of the fiber-forming bushing. In particular, the invention requires a generally horizontal high velocity stream of gas which controls the environment of the bushing.

U.S. Pat. No. 4,033,742 discloses a cooling system of a bushing used in the production of glass fibers which embodies a heated orifice plate with closely placed orifices in a bulk flow of upwardly directed gas. The cooling system comprises a series of opposing nozzles which provide a multiple air lance effect and starting-up, clearing and maintaining the flow of individual glass fibers through each orifice.

U.S. Pat. No. 3,969,099 discloses a bushing environmental system wherein an air stream is passed directly to the region below the bushing from a blower which diverts and irregularly deflects the air stream prior to its release through the bushing region. The air is fed to the fiber glass bushing at about a right angle to the bushing tips.

U.S. Pat. No. 4,197,103 discloses a method for draw forming glass fibers wherein cooling fins extend outwardly from a water pipe and disposed between rows of conical nozzle tips. Additional cooling is provided at least during the initial start-up period by air blown across the nozzle tips. After stabilized filament forming conditions have been reached, usually within 5-10 seconds, the air flow is reduced or terminated.

However, these above-described methods do not reduce migration of sizing material from glass fibers. Most continuous glass fibers have an extended drying period, which sometimes lasts for several days. As water evaporates from the glass surface and as more water migrates to the surface, the water carries components of the size with it. This results in a concentration of dried fiber size on the surface of the fiber which at times can be three times what it is in the middle. Such variations cause undesirable handling changes. Also, when the glass fibers are wound on a collet often the outer layers of the package must be discarded thus causing significant loss in glass fiber.

There has now been invented an improvement of the use of airflow to condition glass filaments prior to the application of a sizing material on the glass filaments. This invention is directed to that improvement.

SUMMARY OF THE INVENTION

In accordance with the present invention, there is provided a method wherein air is employed in place of a water prepad spray during a glass filament forming operation. In particular, an air knive directs a planar stream of air at between approximately 20°-30° angle downwardly from horizontal to cool the solidified glass filaments. The stream of air, which is substituted for water as the cooling medium for the filaments, causes no preceptible change in the fiber forming environment.

The process of the present invention minimizes or eliminates size migration and causes less damage to the glass fibers. The process further allows more uniform and immobile application of sizing to the glass fibers. Further, in the conditioning process of the present invention, the strand tensile strength is maintained and the rod flex properties are equivalent to glass filaments conditions using water.

DESCRIPTION OF THE PREFERRED EMBODIMENT

Figure 1:
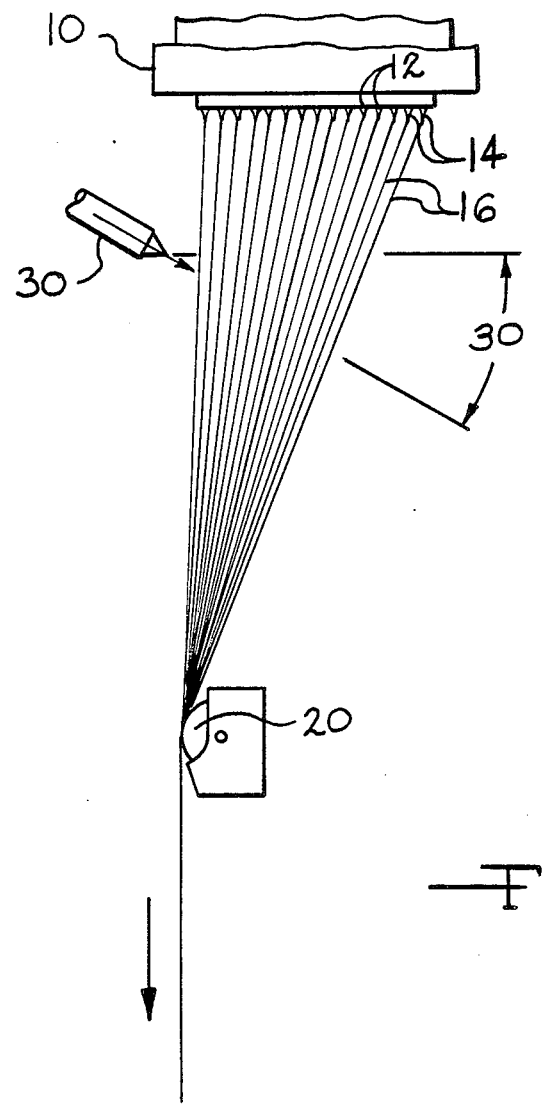
FIG. 1 is a front elevational view of a glass strand forming and sizing application apparatus including an air knife constructed in accordance with one embodiment of the invention.

With respect to the drawings, FIG. 1 fragmentarily shows a bushing 10 to which molten glass is fed. The bushing 10 includes a bottom portion 11 having orifices 12 through which the molten glass flows to form cones 14 of molten glass. The cones are attenuated into filaments 16 and the continuously formed filaments are pulled across a size applicator 20. The size applicator 20 gathers the groups of the filaments into strands which are wound onto packages on tubular cores or spools (not shown) disposed on a rotatably mounted winding collet (not shown).

Positioned between the bushing 10 and the size applicator 20 is an air transvector 30 which is mounted in the same general area as prior art water prepad sprays. The air is directed across the filaments 16 at between approximately 20°-30° angle downwardly from horizontal to cool the filaments. The air is directed across the filaments in a stream of a pressure of between about 5-30 psi and in certain embodiments the preferred ranges are 5-7.5 psi or 15-20 psi. The compressed air delivered by the air transvector 30 has a cooling effect on the filaments. The cooling effect of the air transvector can be regulated more effectively than water. According to the present invention, no water is applied to the glass fibers prior to the applications of the sizing material. As such there is a reduction in the amount of water applied to the glass strands and the additional water does not have to be dried or removed later. Further, the elimination of prepad water and the increased temperatures of the glass filaments at the point of size application creates a dried package having a forming moisture content of below 6% by weight. Improved glass strand results since the glass filaments are exposed to less water.

In addition, the size migration is eliminated or greatly reduced. The sizing materials used in this process, such as silanes, are more efficient at the glass surface. Further, with the use of appropriately designed sizing for the glass fiber being formed an improved coating of the glass occurs.

Other benefits include improving the job efficiency from about 94% to near 100%. Job efficiency is the percent of material, by weight, that is formed into filaments in a package compared to the weight of packages issued for sale to customers. The difference is waste in preparing the packages for shipment. When the job efficiency is improved there are more pounds of fiber available for sale at a lower cost which results in significant cost savings. Further, there is no need for use of deionized water for cooling of the filaments. Deionized water is a cost factor in glass production. To maintain the water deionizing operation requires labor and the use of undesirable materials. For example, all piping used to carrying the dionized water must be stainless steel.

In addition, "run back" labor is eliminated. "Run back labor" is the man-hours required to strip off the outside migration of the package caused by the excess water in the package. This material is the waste which decreased the job efficiency.

Also, the sizing application efficiency is near 100%. Size application efficiency is determined by comparing the number of gallons of sizing mixed to the number of equivalent gallons formed onto good packages. The largest portion of size waste is lost due to the excess placed on the strand during the forming process. The excess is thrown off similar to excess water squeezed out of a sponge. When using the air cooling process of the present invention there is no excess sizing applied to the strand. All that is put on the strand remains on the strand.

Further, bushing hardware costs are reduced by the use of the method of the present invention and a more attractive finished produce is provided. Bushing hardware costs are reduced by the extended life of the equipment. With the air cooling process there is less water in the bushing area which thereby reduces the corrosion and build up of contaminants. The contaminants require washing of the hardware which results in forming position down time.

Tests were conducted showing the effect that replacing water prepad sprays with air in a fiber forming process has on current sizing product characteristics. The process trials were run on various products using the air cooling method of the present invention. Various product physical properties were evaluated in addition to evaluating the migration ratio of the size material. Products were evaluated in filament winding or pultrusion strand tensile strength and NOL ring shear.

The tests show that the use of air cooling and the elimination of the prepad water spray reduces forming moisture, increases the strand temperature in the forming process and gives equal laminate performance, as is seen by referring to the Tables I–VIII below. The temperatures given are in degrees Farenheit.

The data in the tables fall into two areas: process measurements and customer related product performance. The significance of the data is that the process can be made more efficient and produce an improved product (no migration) with no negative effect on laminate performance.

Tables I, II and III show the results of air cooling of a product "A" which eliminates migration and reduces waste. Referring now in particular to Table I, the product "A" was formed using a "single process 30" which means that one bushing forms one package. "STD" refers to the standard condition the product is produced under. Use of the water prepad sprays result in 7-11% forming moisture. Forming moisture percent is determined by weighing the package directly off the collet. The package is then reweighed after drying to measure the amount of water that was originally in the package. Severe abrasion is a test to determine the amount of broken filaments that will result from a dried strand when run past a series of contact points. The units are grams of broken filaments/pound of glass run through the test machine. The severe abrasion, when using the method of the present invention, is reduced.

NOL is an abbreviation for Naval Ordinance Lab. The NOL ring shear test is a measure of the glass filament to resin bonding. The test indicates if a strength change is possible in the use of a different glass or resin. The test results, which are highly dependent on glass content, indicate that there is no loss in bonding retention using the method of the present invention.

Rod flex or rod flexural strength is another test for determining strengths of glass fiber to resin interface. Forming solids percent is the percent of the gross strand weight that is chemicals applied to the filaments. S.A. is severe abrasion fuzz in grams per pound. Rod flex is in pounds per square inch.

Table II compares the rod flexual properties for standard produced material versus material using the air cooled method. As can be seen, the product formed using the method of the present invention compares favorably to the product formed using the conventional method.

Table III shows that the percent of forming moisture for air cooled glass using the method of the present invention is 4.4% which is half that of the standard, namely 9.5%.

Further tests shown in Tables I, III, IV and V show that the percentage of forming moisture was greatly decreased with air cooling while the strand tensile strengths increased.

In Table VI a product is compared for pipe wall thickness. The product performance shows elimination of streaks due to turnarounds (migrated sizing) in the pipe. In addition, the air cooled material absorbs resin faster and more completely than the standard product. No fuzz differences were observed in the filament winding or pultrusion. Table VI also shows the evaluation of different glass processing techniques for sections of pipe showing that the air cooled glass filaments produce pipe with improved cyclic performance.

Tables I, IV, V and VII also show that the migration ratio of materials formed using the air cooling method is greatly reduced from the standard method, while the various other desirable physical characteristics remain equivalent or within favorable ranges.

Various modifications may be made to the process described without departing from the spirit and scope of the invention as set forth by the following claims.

TABLE I

| (Product A) | | | | | |
|---|---|---|---|---|---|
| Process Measurements | | | | | |
| Air Pressure | Temperature @ Applic. | % Forming Moisture | Migration Ratio | % Solids | Grams/# Severe Abrasion |
| 15 psi | 360–370 | 5.0 | 1.0 | .63 | .0002 |
| 20 psi | 340–360 | 5.3 | 1.0 | .63 | .0002 |
| STD | 115–124 | 9.3 | 3.2 | .56 | .0005 |

| Product Performance Strand Tensile (ASTM D2343) | | |
|---|---|---|
| | % Glass | Stress PSI |
| 15 psi | 59.6 | 339,261 |
| STD | 59.1 | 338,446 |

| NOL Ring Shear (ASTM D2344) | | | | |
|---|---|---|---|---|
| | Stress PSI ($\sigma$) | | | |
| | 48 Hour | % | 72 Hour | % |
| % | | | | |

TABLE I-continued
(Product A)

| | Glass | Dry | boil | Retention | boil | Retention |
|---|---|---|---|---|---|---|
| 15 psi | 76.7 | 9539 | 9448 | 99 | 9370 | 98 |
| STD | 76.5 | 9742 | 9416 | 97 | 9671 | 99 |

TABLE II

| | Product A | | | | | Product A | | | |
|---|---|---|---|---|---|---|---|---|---|
| Forming Position | 112 | 113 | 113 | 115 | 116 | 111 | 112 | 113 | 114 |
| Forming Solids % | .60 | .61 | .53 | .56 | NR | .67 | .61 | .58 | .70 |
| | .60 | .62 | .64 | .58 | .55 | .65 | .68 | .60 | .70 |
| | | | | | | .67 | .67 | .61 | .71 |
| Severe Abrasion | .0019 | .0003 | .0026 | .0006 | | .0003 | .0006 | .0009 | .0036 |
| Grams/# | .0013 | .0008 | .0027 | .0009 | .0008 | | | | |
| Forming Moisture % | 4.7 | 4.3 | 3.9 | 3.4 | | 5.4 | 4.5 | 4.3 | 5.3 |
| Migration Ratio | 1.03 | 1.03 | 1.08 | .97 | | 1.11 | 1.00 | 1.00 | 1.03 |

| Product "A" Comparison to Standard | STD | AK |
|---|---|---|
| Rod Flex PSI | 189,786 | 194,089 |
| | 201,260 | 201,437 |
| % Retention | 91.2 | 96 |
| | 93.6 | 95.6 |
| % Glass | 70.0 | 70.2 |
| Pipe % Glass | 64.7 | 65.8 |
| Pipe Wall Thickness | .153" | .166" |
| | .147 | .152 |
| | .155 | .151 |

TABLE III
(Product "A")

| Test | Standard | Air Cooling |
|---|---|---|
| % Forming Moisture | 9.5 | 4.4 |
| Pipe Results (Polyester Resin) | | |
| % Glass | 63.6 | 61.5 |
| Thickness | .072" | .078" |
| Strand Tensiles PSI | 363,514 | 376,651 |
| Polyester Rod Flexural Test % Retention | | |
| Post 24 hour boil | 96 | 95 |
| Post 48 hour boil | 91 | 91 |

TABLE IV
(Product B)

| Process | Temp @ Appl | Forming Moisture % | % Solids | Migration Ratio | Grams/Pound Severe Abrasion |
|---|---|---|---|---|---|
| 15 psi | 482 | 1.56 | .48 | .95 | .0024 |
| | 435 | 2.60 | .58 | .86 | .0133 |
| | 430 | 1.58 | .46 | .98 | .0044 |
| Standard | 287 | 10.16 | .70 | 2.94 | .0002 |
| | 250 | 10.16 | .64 | 3.76 | .0009 |
| | 250 | 7.29 | .55 | 1.64 | .0019 |

Strand Tensile (ASTM D2343)

| | % Glass | Stress Psi |
|---|---|---|
| 15 psi | 62.5 | 347,337 |
| Standard | 64.6 | 320,181 |

Pultrusion Evaluation

| | Pultrusion Inches/Min | Shear % Retention Post 24 hr. boil | Flex % Retention Post 24 hr. Boil |
|---|---|---|---|
| Std | 12 | 129 | 110 |
| Std | 18 | | |
| Std | 22 | 138 | 118 |
| Std | 24 | | |
| Std | 30 | | |
| 15 psi | 12 | 124 | 112 |
| 15 psi | 18 | | |
| 15 psi | 22 | 138 | 117 |
| 15 psi | 24 | | |
| 15 psi | 30 | | |

TABLE V
(Product "C")

| Test | Water Standard | Air Cooling |
|---|---|---|
| % Forming Moisture | 6.5 | 3 |
| % Strand Solids | .67 | .73 |
| Severe Abrasion-Grams/Pounds | .002 | .006 |
| Migration Ratio | 3.6 | 1 |
| Strand Tensile PSI | 321,000 | 325,000 |

TABLE VI
Vinylester Pipe Cycles Product "D"

| | Standard | Air Cooled |
|---|---|---|
| Wall Thickness | 0.72 | 0.69 |
| | 0.72 | 0.68 |
| | 0.72 | 0.70 |
| | 0.71 | 0.69 |
| Cycles To Weep | 740 | 1095 |
| | 827 | 1049 |
| | 555 | 855 |
| | 730 | 801 |
| | x̄713 | x̄950 |
| | σ114 | σ144 |

TABLE VII
(Product "E") Results

| | Standard | Air Cooled |
|---|---|---|
| % Strand Solids | .47 | .51 |
| Forming Moisture % | 9.39 | 3.46 |
| Migration Ratio | 3.55 | .89 |
| Pipe Wall Thick (polyester) | .177 | .166 |
| Pipe Wall Thick (Vinylester) | .181 | .167 |
| | .172 | .177 |
| % Glass | 67.5 | 69.7 |
| Rod Flex % | 96.3 | 91.9 |
| Dry PSI | 180,022 | 189,078 |
| Rods % Glass | 70 | 70 |

What is claimed is:

1. A method for forming continuous glass fibers consisting essentially of the steps of:
   supplying a plurality of streams of molten glass from a bushing;
   drawing the streams into continuous filaments;
   passing a stream of air across the continuous filaments in a direction of between approximately 20°–30° below horizontal to cool and regulate the temperature of the continuous filaments, thus maintaining the continuous filaments at a predetermined temperature while keeping the continuous filaments essentially free of moisture;
   thereafter applying a sizing material to the cooled continuous filaments in a concentration sufficient to result in the continuous filaments' having a moisture content of below about 6%, by weight;
   collecting the continuous filaments on a spindle or collet.

2. The method of claim 1 in which the air stream passing across the continuous filaments is provided at a pressure between about 5–30 psi.

3. The method of claim 1 in which the air stream passing across the continuous filament is provided at a pressure between about 5–7.5 psi.

4. The method of claim 1 in which the air stream passing across the continuous filament is provided at a pressure between about 15–20 psi.

* * * * *